Nov. 7, 1950     A. N. SPANEL     2,528,980
RUBBER OR LATEX ARTICLE
Filed Dec. 6, 1945     2 Sheets—Sheet 2
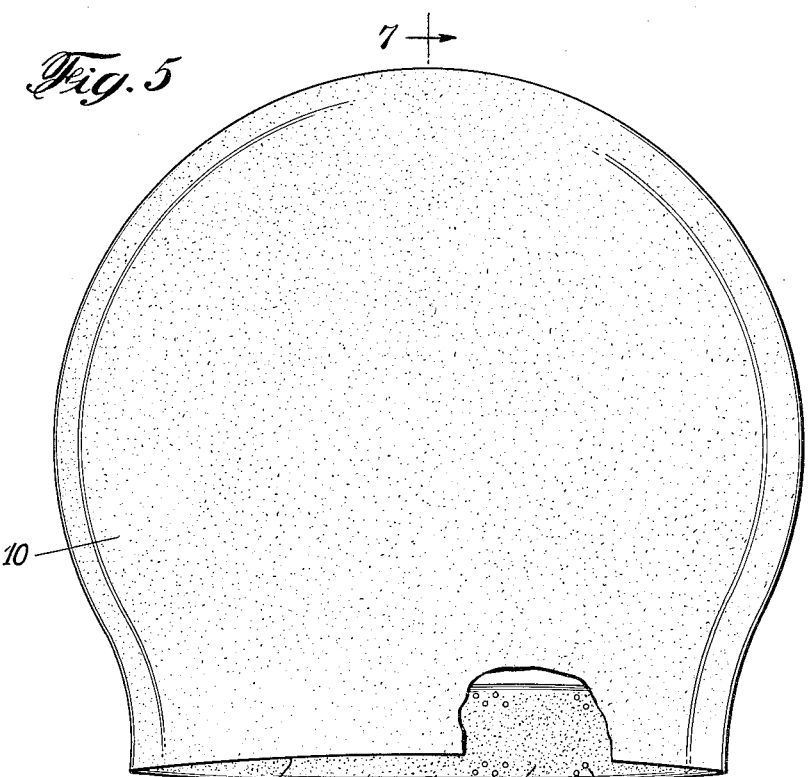
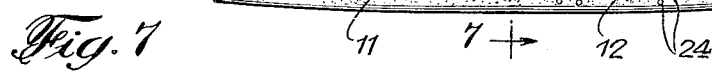
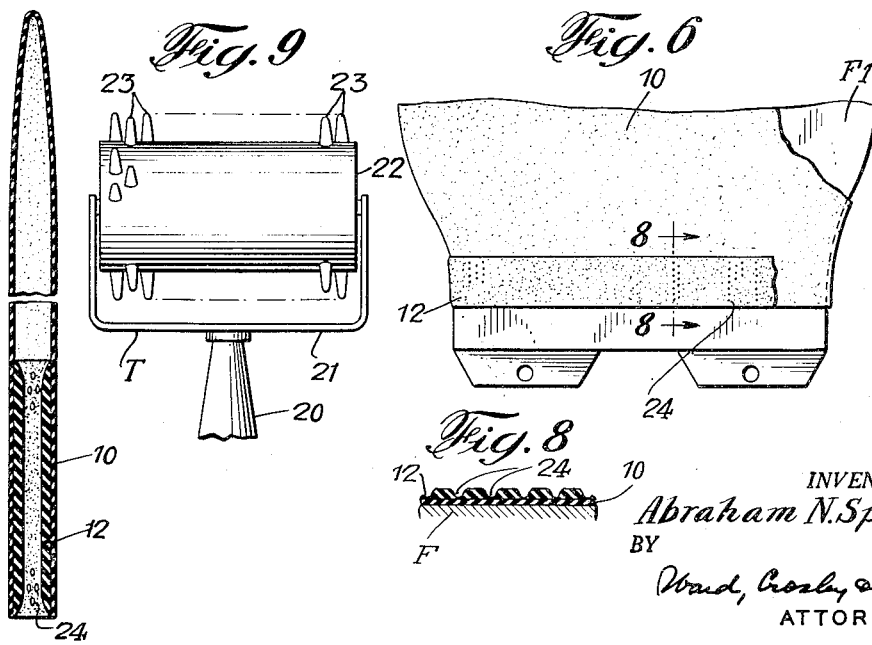
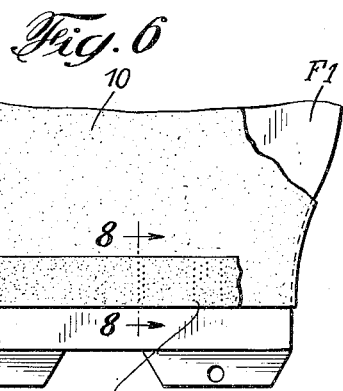
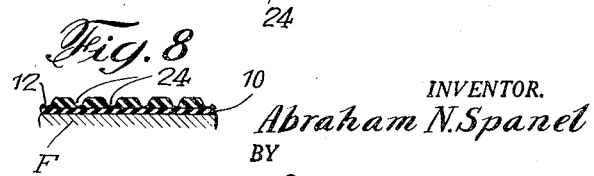
INVENTOR.
Abraham N. Spanel
BY
ATTORNEYS Patented Nov. 7, 1950

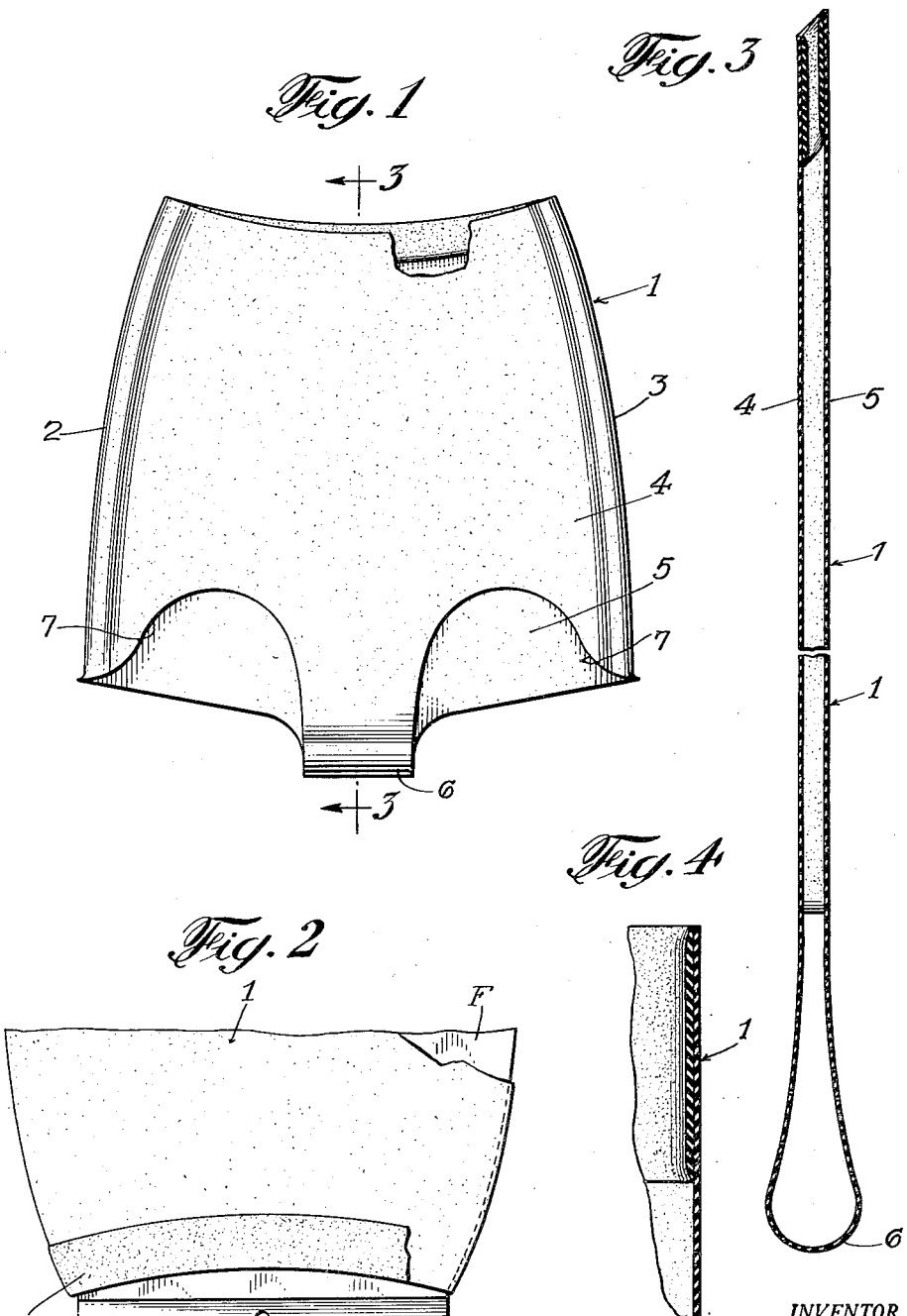

2,528,980

UNITED STATES PATENT OFFICE 2,528,980

RUBBER OR LATEX ARTICLE

Abraham N. Spanel, Princeton, N. J.

Application December 6, 1945, Serial No. 633,084

8 Claims. (Cl. 2—43)

My invention relates to articles formed from rubber or latex material.

My invention has more particular reference to articles of wearing apparel such, for example, as girdles or bathing caps which are formed principally from latex or rubber films, respectively. In accordance with the invention, a band, strip or layer of latex foam is secured in desired position to the article and, more particularly, to one end thereof whereby, when the article is worn, a latex foam surface directly engages the skin of the wearer with the resultant advantages hereinafter described.

My invention has further reference to articles formed from latex or rubber film and an attached layer of latex foam which, in suitable manner, is dimpled or indented on one surface thereof. Subject matter disclosed but not claimed herein is claimed in my divisional application Serial No. 738,029, filed March 29, 1947.

Various other objects and advantages of my invention will become apparent from the following detailed description.

My invention resides in the rubber or latex articles, combination and features of the character hereinafter described and claimed.

For an understanding of my invention and for an illustration of some of the forms thereof, reference is to be had to the accompanying drawings, in which:

Figure 1 is an elevational view, partly broken away, showing a girdle as constructed in accordance with my invention;

Fig. 2 is an elevational view, partly broken away, showing a portion of the girdle on a form;

Fig. 3 is an enlarged longitudinal sectional view taken on the line 3—3 of Fig. 1;

Fig. 4 is an enlarged, fragmentary sectional view, partly in elevation, showing the upper part of the girdle;

Fig. 5 is an elevational view, partly broken away, showing a bathing cap as constructed in accordance with my invention;

Fig. 6 is an elevational view, partly broken away, showing a portion of the bathing cap on a form;

Fig. 7 is a vertical sectional view taken on the line 7—7 of Fig. 5;

Fig. 8 is an enlarged elevational view showing a latex or rubber film and an attached layer of latex foam having one surface dimpled or indented; and Fig. 9 is an elevational view showing a dimpling or indenting tool.

Referring to Figs. 1, 3 and 4, I have shown a girdle which comprises a sheath-like member 1 having longitudinally extending side areas 2 and 3 serving to connect the longitudinally extending front and rear girdle surfaces 4 and 5. Further, as shown, the sheath-like member 1 comprises a crotch 6 disposed between the leg openings 7, 7.

A girdle of the character referred to above may be formed from the latex or rubber film produced by dipping a suitable form F, Fig. 2, one or more times in an aqueous dispersion of rubber, either natural or synthetic, which may include numerous well known ingredients better adapting it for dipping purposes. As a result of the described dipping operations, the aforesaid sheath-like member 1 in the form of a latex or rubber film is produced on the exterior surface of the form F.

As will be understood from the disclosure of my pending application Serial No. 633,082 filed December 6, 1945, now Patent No. 2,478,599, granted August 9, 1949, the lower end of the latex or rubber film (the upper end of the girdle) while on the form F and after it has been suitably dried but before any substantial vulcanization thereof has been effected, may have an encircling band, strip or layer 8 of latex foam secured or applied thereto by extrusion from a nozzle or equivalent. Preferably, this latex foam is substantially unvulcanized and of the general character described in U. S. Letters Patent 2,321,111. After completion of the described operation, the sheath-like member 1 and the adhering band, strip or layer of latex foam 8 may be vulcanized together on the form F.

Alternatively, as will be understood from the disclosure of my pending application Serial No. 633,083 filed December 6, 1945, now Patent No. 2,478,600, granted August 9, 1949, the band, strip or layer 8 of latex foam may be a preformed article which is substantially unvulcanized. Further, said band, strip or layer 8 of latex foam is capable of adhering to a latex or rubber film. Still further, it is capable of receiving and retaining an impression. Therefore, it is substantially or somewhat "tacky" and this term will be hereinafter used in connection with this characteristic of the latex foam. As such, the band, strip or layer 8 of latex foam may be applied in the disclosed position to the sheath-like member 1 whereupon the latter, together with said adhering band, strip or layer 8 of latex foam may be vulcanized together on the form F. Or, as will be understood from the disclosure of the last named pending application, the band, strip or layer 8 of latex foam may be secured otherwise to the sheath-like member 1 and the complete, vulcanized article may be obtained otherwise than as discussed above.

Still further, it shall be understood that the lower end of the latex or rubber film (the upper end of the girdle) while on the form F, and after it has been suitably dried but before any substantial vulcanization thereof has been effected, may be dipped one or more times in substantially unvulcanized latex foam of the general character described in the aforesaid U. S. Letters Patent No. 2,321,111. After completion of this operation, the sheath-like member 1 and the adhering band, strip or the like of latex foam 8 may be vulcanized together on the form F.

Depending upon the selected procedure, the girdle is vulcanized either on or off the form F and, after it has been stripped from the form, it is turned inside out before it is worn. When worn, the latex foam band 8 is at the top of the girdle and the latex foam surface thereof is disposed directly in contact with the body of the wearer. Particularly by reason of the adhesion effect of the irregular or sponge-like latex foam surface on the skin, the girdle is supported in its intended position and there is little or no tendency for the upper part of the girdle to sag or curl downwardly. This is highly desirable as regards comfort and appearance. Aside from the band 8 of latex foam, the body of the wearer is engaged directly by the rubber or latex film surface of the girdle. This functions in a desirable constricting, molding or shaping manner with respect to the part of the human body engaged thereby.

Referring to Figs. 5 and 7, I have shown a bathing cap which is formed from a suitably shaped member 10 entirely closed except for a lower opening 11. A bathing cap of the character referred to may be formed from the latex or rubber film produced by dipping a suitable form F1, Fig. 6, one or more times in an aqueous dispersion of rubber of the character hereinbefore described. As a result of the described dipping operations, the aforesaid member 10, in the form of a latex or rubber layer or film, is produced on the exterior surface of the form F1. Generally, in suitable manner for example, as with the embodiment of the invention first described, the outer lower end of said latex or rubber film has applied thereto an encircling band, strip or layer 12 of latex foam which may be and preferably is of the character described above.

Depending on the selected procedure, the bathing cap is vulcanized either on or off the form F1 and, after it has been stripped from the form, it is turned inside out before it is worn. When worn, the latex or rubber film of the bathing cap contacts directly with the head of the wearer and forms an enclosure for the hair. The latex foam layer 12 forms an endless band which, at its irregular, sponge-like exterior surface, contacts directly with the skin of the wearer across the forehead, in front of both ears, thence downwardly and around the rear neck surface. The latex foam surface of the band or layer 12, by reason of its adhesion effect, forms a closed sealed surface on the skin of the wearer and, to great extent or entirely, prevents the entrance of water interiorly of the bathing cap. As will be understood, the latex or rubber film is waterproof and hence, by my invention, the bathing cap as an entirety functions effectively for its intended purpose.

A feature of my invention of distinct importance resides in the fact that the latex foam is applied to the latex or rubber film only as a band, strip or layer. In the usual case, then, in accordance with the invention, most of the area of the composite article of wearing apparel is defined solely by the latex or rubber film. Articles of wearing apparel of this character have certain desirable advantages compared with similar articles which are entirely or substantially covered with latex foam. Thus, when worn, the wearing apparel articles of the invention are cooler and the elasticity of the article is not greatly restrained with the result that it may readily be applied to and removed from the body of the wearer.

While the invention has been illustrated and described in connection with particular articles, namely, a girdle and a bathing cap, it shall be understood that the invention is not to be thus limited. Thus, a layer of latex foam may be secured to a selected portion of such other rubber or latex film article as may be chosen and, when this is done, the latex foam surface will coact with the skin of the wearer for desirable purposes as will be understood.

Referring to Fig. 9, I have illustrated a tool T which comprises a handle 20 having secured thereto a U-shaped member 21 in which a cylinder 22 is journaled. Projecting from the exterior surface of the cylinder 22 are a plurality of tapered members 23 each of which, to some extent, has a blunt outer end as defined, for example, by a surface having a radius of curvature of one-sixteenth of an inch, more or less. The members 23 may be so arranged, for example, that the outer ends thereof are symmetrically spaced from each other distances of one-quarter of an inch more or less.

After a band, strip or layer 12 of latex foam, which is somewhat tacky or capable of receiving and retaining an impression, has been applied to the latex or rubber film forming the member 10 and, while this composite structure is suitably supported, as by the form F1, the tool T, while held in one hand, is moved lengthwise along said band, strip or layer 12 of latex foam to cause the tool members 23 to form in said somewhat tacky band, strip or layer 12 of latex foam dimples or indentations 24 which extend thereinto a substantial distance from the outer irregular or sponge-like surface thereof. These dimples or indentations 24 retain their identity in the finished product and open on the outer surface thereof. As a result of this operation, the latex foam band or strip 12 is caused to have better contact with and to be more firmly secured to the latex or rubber film. Further, due to the presence of the dimples or indentations 24, the band or strip 12 of latex foam more effectively remains in engagement with the skin of the wearer by a suction or vacuum effect exercised by said indentations 24.

It shall be understood that the feature of the invention involving the dimples or indentations 24 is of general application in the latex foam art and that there is to be no restriction to bands of latex foam nor even to articles of wearing apparel embodying layers or coverings of latex foam. Within the purview of this phase of the invention, it is intended that the appended claims shall cover the broad idea of providing dimples or indentations in a strip, sheet or covering of latex foam which engages or is attached to a latex or rubber film, or equivalent.

While the invention has been described with respect to certain particular preferred examples which give satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. An article of wearing apparel having at least one open end and adapted to extend along a part of the human body, said article comprising a latex or the like rubber film adapted to contact directly with and encircle a part of the human body, said article further comprising an inner band formed from latex foam adhering to a part only of said film and having an exposed inner latex foam surface adapted, throughout the area thereof, to directly and intimately engage an area of skin on the surface of the human body, said rubber film overlying said latex foam band being the sole means for holding said band in intimate engagement with the body of the wearer.

2. An article of wearing apparel having at least one open end, said article being adapted to extend along a part of the human body, said article comprising a latex or the like rubber film adapted to contact directly with and encircle a part of the human body, said article further comprising an endless inner band formed from latex foam adhering to said film only in the area thereof adjacent to the open end of said article, said band of latex foam having an exposed inner latex foam surface adapted, throughout the area thereof, to encircle a part of the human body in direct and intimate engagement with the skin and said rubber film overlying said latex foam band being the sole means for holding said band in intimate engagement with the body of the wearer.

3. A bathing cap comprising a latex or the like rubber film adapted to form an enclosure for the upper part of the head and the hair of the wearer, and an endless inner band of latex foam adhering to said latex film at the bottom of the bathing cap, the inner latex foam surface of the latex foam band, throughout the area thereof, being exposed so as to directly and tightly engage and form a seal on the skin of the wearer to thereby prevent entrance of water interiorly of the bathing cap and said rubber film overlying said latex foam band being the sole means for holding said band in tight engagement with the skin of the wearer.

4. A composite article comprising a latex or the like rubber film and presenting an exposed outer surface, and a layer of latex foam adhering to said film, the latex foam layer having dimples or indentations extending thereinto a substantial distance from the irregular outer surface thereof, said layer being more dense and in more intimate adherence in separated areas corresponding to said indentations than the area of said layer surrounding said indentations.

5. A composite article comprising a latex or the like rubber film and presenting an exposed outer surface, and a layer of latex foam adhering to said film, the latex foam layer having uniform dimples or indentations extending thereinto from the outer surface thereof, said layer being more dense and in more intimate adherence in separated areas corresponding to said indentations than the area of said layer surrounding said indentations.

6. An article of wearing apparel comprising a latex or the like rubber film adapted to contact directly with and encircle a part of the human body and having at least one opening therein, and an endless inner band of latex foam adhering to said latex film at the marginal edge surrounding said opening, the inner latex foam surface of the latex foam band, throughout the area thereof, being exposed so as to directly and intimately engage the skin of the wearer and prevent slipping or curling of said marginal edge and said rubber film overlying said latex foam band being the sole means for holding said band in intimate engagement with the body of the wearer.

7. A girdle comprising a latex or the like rubber film adapted to contact directly and encircle the human torso and having a waist opening, and an endless inner band of latex foam adhering to said latex film interiorly thereof at the marginal edge surrounding said waist opening, the inner latex foam surface of said band throughout the area thereof being adapted to directly engage the skin of the wearer and prevent sagging or downward curling of the upper marginal edge of said girdle and said rubber film overlying said latex foam band being the sole means for holding said band in engagement with the body of the wearer.

8. A girdle comprising a latex or the like rubber film adapted to contact directly and encircle the human torso and having a waist opening, and an endless inner band of latex foam adhering to said latex film interiorly thereof at the marginal edge surrounding said waist opening, and having dimples or indentations extending thereinto a substantial distance from the irregular outer surface thereof, said band being more dense and in more intimate adherence in separated areas corresponding to said indentations than the areas of said band surrounding said indentations, the inner latex foam surface of said band throughout the area thereof being adapted to directly engage the skin of the wearer and prevent sagging or downward curling of the upper marginal edge of said girdle and said rubber film overlying said latex foam band being the sole means for holding said band in engagement with the body of the wearer.

ABRAHAM N. SPANEL.

REFERENCES CITED

The following references are of record in the file of this patent:

UNITED STATES PATENTS

| Number | Name | Date |
| --- | --- | --- |
| 1,746,477 | Howland | Feb. 11, 1930 |
| 1,761,302 | Howland | June 3, 1930 |
| 1,837,965 | Howarth | Dec. 22, 1931 |
| 1,957,732 | Rowe | May 8, 1934 |
| 2,063,232 | Davies | Dec. 8, 1936 |
| 2,192,837 | Luck | Mar. 5, 1940 |
| 2,285,659 | Howland | June 9, 1942 |
| 2,360,736 | Spanel | Oct. 17, 1944 |
| 2,361,682 | Grabec | Oct. 31, 1944 |